United States Patent
Jard et al.

(10) Patent No.: US 7,184,465 B2
(45) Date of Patent: Feb. 27, 2007

(54) SIGNAL PROCESSING METHOD AND APPARATUS FOR A SPREAD SPECTRUM RADIO COMMUNICATION RECEIVER

(75) Inventors: Alexandre Jard, Suresnes (FR); Hassan El Nahas El Homsi, Paris (FR); Moussa Abdi, Paris (FR)

(73) Assignee: Nortel Networks Limited, St. Laurent (CA)

( * ) Notice: Subject to any disclaimer, the term of this patent is extended or adjusted under 35 U.S.C. 154(b) by 859 days.

(21) Appl. No.: 10/164,129

(22) Filed: Jun. 5, 2002

(65) Prior Publication Data

US 2003/0043893 A1    Mar. 6, 2003

(30) Foreign Application Priority Data

Jun. 6, 2001   (FR)   ................................. 01 07399

(51) Int. Cl.
  *H04B 1/69*  (2006.01)
  *H03D 1/00*  (2006.01)
(52) U.S. Cl. ................ 375/152; 375/143; 375/343
(58) Field of Classification Search ................ 375/267, 375/261, 298, 299, 148, 130, 140, 147, 143, 375/152, 343; 370/294, 342, 347; 708/520, 708/322; 455/12.1, 21
See application file for complete search history.

(56) References Cited

U.S. PATENT DOCUMENTS

| | | | | |
|---|---|---|---|---|
| 6,011,812 A | | 1/2000 | Laakso et al. | |
| 6,157,811 A | * | 12/2000 | Dent | 455/12.1 |
| 6,470,044 B1 | * | 10/2002 | Kowalski | 375/148 |
| 2002/0034263 A1 | * | 3/2002 | Schmidl et al. | 375/299 |
| 2002/0152253 A1 | * | 10/2002 | Ricks et al. | 708/520 |
| 2002/0154705 A1 | * | 10/2002 | Walton et al. | 375/267 |
| 2003/0002450 A1 | * | 1/2003 | Jalali et al. | 370/294 |

FOREIGN PATENT DOCUMENTS

EP    1 077 551    2/2001

OTHER PUBLICATIONS

Gradient eigenspace projections for adaptive filtering; Nair, N.G.; Spanias, A.S.; Circuits and Systems, 1995., Proceedings., Proceedings of the 38th Midwest Symposium on vol. 1, Aug. 13-16, 1995 pp. 259-263 vol. 1.*

(Continued)

*Primary Examiner*—Temesghen Ghebretinsae
(74) *Attorney, Agent, or Firm*—Trop, Pruner & Hu, PC

(57) ABSTRACT

A signal received by a base station is fed to a set of filters matched to spreading codes allocated to pilot channels originating from radio terminals. The outputs from the matched filters are processed so as to estimate parameters comprising, for each channel, eigenvectors representing propagation paths associated with respective amplitudes of reception along these paths. The processing of the output signals from the matched filters comprises an estimation of parameters for a first channel received with a fairly high power by the base station, a correction of the output from the matched filter of a second channel having less energy, taking account of at least one of the eigenvectors of the first channel, and an estimation of parameters for this second channel on the basis of the modified output from said matched filter.

6 Claims, 1 Drawing Sheet

OTHER PUBLICATIONS

Improving the performance of blind CDMA 2D-RAKE receivers with phase ambiguity in the bit decision variable Stephenne, A. et al; Signals, Systems & Computers, 1998. Conf. Record of 32$^{nd}$ Asilomar Conf. on vol. 2, Nov. 1-4, 1998, pp. 1882-1886, vol. 2.*
Highly parallel recursive/iterative Toeplitz eigenspace decomposition; Beex, A.A.; Fargues, M.P.; Acoustics, Speech, and Signal Processing, IEEE Transactions on vol. 37, Issue 11, Nov. 1989 pp. 1765-1768.*

Toeplitz eigensystem solver; Yu Hu; Sun-Yuan Kung; Acoustics, Speech, and Signal Processing [see also IEEE Transactions on Signal Processing], IEEE Transactions on vol. 33, Issue 5, Oct. 1985 pp. 1264-1271.*
Technical Specification 3G TS 25.211, version 3.3.0, <<Physical Channels and Mapping of Transport Channels onto Physical Channels (FDD) (Release 1999)>>, Jun. 2000, Third Generation Partnership Project.

* cited by examiner

SIGNAL PROCESSING METHOD AND APPARATUS FOR A SPREAD SPECTRUM RADIO COMMUNICATION RECEIVER

BACKGROUND OF THE INVENTION

The present invention relates to mobile radio communication systems using code division multiple access (CDMA) techniques. It lies within the receivers used in the fixed stations of these systems and operating a coherent demodulation of spread spectrum signals originating from a set of radio terminals.

Coherent demodulation requires various parameters representing the propagation channel between the transmitter and the receiver. Some of these parameters vary relatively slowly and can be estimated by statistical survey procedures. Such is the case for example for the delays assigned to the multiple propagation paths in the conventional rake receiver. The delays specific to the various paths can be updated at fairly low frequency, for example of the order of about a hundred milliseconds. Other parameters have abrupt variations, on the scale of the duration of an information symbol, which are due to the phenomenon of fading. Such is the case in particular for the instantaneous amplitudes of reception of the symbols following the propagation paths taken into consideration, which are necessary for coherent demodulation. These instantaneous amplitudes are complex amplitudes, manifesting the attenuation and the phase shift which are undergone at each instant along the paths. In general, these complex amplitudes are estimated from symbols known a priori, or pilot symbols, interspersed among the information symbols transmitted so as to allow coherent demodulation.

It is known that CDMA receivers are affected by the near-far problem according to which transmission from mobiles near a base station tends to mask that from distant mobiles. The reason is that all these mobiles share the same uplink frequency at the same time, the distinction between them resulting from the quasi-orthogonality of the spreading codes. Transmission power controls procedures are implemented in order to limit the impact of this problem, but nonetheless the base station does not receive with the same power the signals transmitted by the various mobiles, in particular when the spreading factors of the various channels are not the same or when a mobile is moving fast, which may bias the power control algorithm.

In general, channel estimation methods make the assumption that the noise present on a channel is white noise. This assumption is correct in the case of thermal noise, although not for the noise generated by the other transmitters. The estimation methods then generate errors which are especially appreciable when the power received on a channel dominates that received on one or more other channels.

An object of the present invention is to make the estimates of superposed CDMA channels more reliable in order to improve the performance of the receivers.

SUMMARY OF THE INVENTION

The invention thus proposes a signal processing method for a base station of a code division multiple access radio communication system, wherein a first signal received by the base station is fed to a set of filters matched to spreading codes allotted to pilot channels originating from respective radio terminals, and output vectors from the matched filters are processed so as to estimate parameters representing said channels. The estimated parameters for a channel originating from a radio terminal comprise eigenvectors representing propagation paths between this radio terminal and the base station, respectively associated with amplitudes of reception along said paths. According to the invention, the processing of the output vectors from the matched filters comprises an estimation of parameters for at least one first channel on the basis of the output vector from a first filter matched to the spreading code allocated to said first channel, a modification of the output vector from a second filter matched to the spreading code allocated to at least one second channel, the output vector from the second matched filter having on average less energy than the output vector from the first matched filter, and an estimation of parameters for said second channel on the basis of the modified output vector of the second matched filter. The modification of the output vector from the second matched filter comprises at least one subtraction of a vector proportional to a projection of said output vector from the second matched filter parallel to a vector of the form $M^H.M_1.v_{1,i}$, where $M_1$ and $M$ are matrices determined by the spreading codes respectively allocated to said first and second channels, $v_{1,i}$ is one of the estimated eigenvectors for the first channel, and $(.)^H$ designates the conjugate transpose.

The eigenvector $v_{1,i}$ is advantageously the estimated eigenvector for the first channel which is associated with the amplitude whose modulus is on average the highest. It is also possible to take account of several eigenvectors associated with eigenvalues of high modulus in the diagonalization of the autocorrelation matrices of the fading on the various channels.

A correction of the estimated impulse responses of channels received relatively weakly is thus undertaken, after the matched filtering, so as to take account of the interference caused by one or more paths of one or more channels received with more power.

This correction does not introduce very much complexity into the receiver, especially when short spreading codes are used.

It amounts to projecting the estimated impulse response vector of the low-energy channel (at the output of the matched filter) onto a subspace orthogonal to the eigenvector associated with the strongest path of the channel received with the most power. The bias thus introduced is very weak and it avoids the estimation errors due to the possible presence of a powerful interferer.

To avoid any problems of noise amplification when the white noise is more powerful than the interferer, a weighting of the projection is preferably undertaken. The subtracted vector is then given by $$\frac{\alpha_i}{\alpha_i + N0} J_i \cdot J_i^H \cdot \hat{h},$$

where $\hat{h}$ is the output vector from the second matched filter, $$J_i = \frac{1}{Q} \cdot M^H \cdot M_1 \cdot v_{1,i},$$

Q is the spreading factor on the pilot channels, $\alpha_i$ is an average power of reception along the propagation path represented by the eigenvector $v_{1,i}$ (eigenvalue associated with $v_{1,i}$) and N0 is an estimated noise power on the second channel.

The method is applicable when the signals are transmitted on two parallel pathways or channels between the transmitter and the receiver, for example two quadrature pathways, one of which comprises pilot symbols known a priori and the other of which comprises unknown information symbols. This case is that of the uplink in third-generation cellular systems of UMTS ("Universal Mobile Telecommunications System") type.

Each of the pilot channels is then formed jointly with a quadrature data channel emanating from the same radio terminal. A second signal, received by the base station in phase quadrature with respect to said first signal, is fed to a second set of filters matched to spreading codes respectively allocated to the data channels originating from the radio terminals. Some at least of the output vectors from the matched filters of the second set are modified, and information symbols transmitted on a data channel originating from a radio terminal are estimated by feeding the modified output vector from the second filter matched to the spreading code allocated to this data channel to a rake receiver defined by the parameters estimated for the pilot channel originating from said radio terminal. The modification of the output vector from said matched filter of the second set comprises at least one subtraction of a vector proportional to a projection of said output vector parallel to a vector of the form $M'^H.M_1.v_{1,i}$, where M' is a matrix determined by the spreading code allocated to said data channel.

Stated otherwise, the same correction by projection is performed on the pilot channels and on the data channels.

Another aspect of the present invention relates to a signal processing device for a base station, tailored to the implementation of the above method.

DESCRIPTION OF PREFERRED EMBODIMENTS

The invention is described below within the framework of a spread spectrum radio communication system using a code-division multiple access technique (CDMA) of which UMTS is an example. A channel of such a system on a carrier frequency is defined by a spreading code composed of discrete samples called "chips", having real values (±1) or complex values $(\pm 1\pm j)/\sqrt{2}$, which follow one another at a chip rate $F_c$.

In the case of the uplink (from the terminals to the base stations) of a UMTS network in frequency division duplex (FDD) mode, a terminal uses two quadrature channels each using a real-valued spreading code together with binary phase modulation (BPSK, "Binary Phase Shift Keying") and $F_c$=3.84 Mchip/s. The two BPSK signals modulate two quadrature radio waves. One of these two channels (I pathway) carries the user data, and the other (Q pathway) carries control information.

This control information comprises pilot bits known a priori to the base station and which allow it to estimate the parameters of the propagation channel. In what follows, reference will therefore be made to the I pathway as being the pilot channel.

Figure 1:
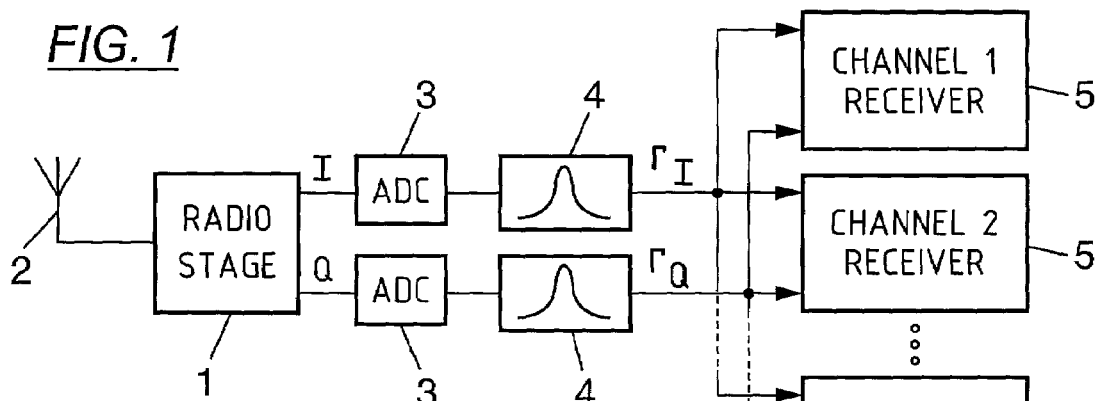
FIG. 1 is a block diagram of the reception part of a base station according to the invention.

FIG. 1 shows the reception part of a base station ("node B") of a UMTS type network in FDD mode operating on the two quadrature pathways (I and Q). The I pathway (real part of the complex baseband signal) transports the data bits, while the Q pathway (imaginary part) transports the control bits, in particular the pilot bits, with for example a spreading factor Q=256. For a precise description of these uplink channels reference may be made to the technical specification 3G TS 25.211, version 3.3.0, "Physical Channels and Mapping of Transport Channels onto Physical Channels (FDD) (Release 1999)", published in June 2000 by the 3GPP ("3$^{rd}$ Generation Partnership Project"), section 5.2.1.

The base station illustrated by FIG. 1 comprises a radio stage 1 which performs the analogue processing required on the radio signal picked up by the antenna 2. The radio stage 1 delivers a complex analogue signal whose real and imaginary parts are digitized by the analogue/digital converters 3 on respective processing pathways I and Q. On each pathway, a matched filter 4 tailored to the pulse shaping by the transmitter produces a digital signal $r_I$, $r_Q$ at the chip rate of the spreading codes.

The resultant complex signal $r=r_I+j.r_Q$ is fed to receivers 5 which effect the processing for estimating the responses of k channels and the symbols sent on these k channels.

The signals transmitted by a terminal to a base station propagate along multiple paths, and arrive at the base station together with signals sent by other terminals with other spreading codes.

Consider the reception by the base station of an unknown information bit b on the I pathway from a mobile terminal, in synchronism with a known pilot bit (equal to 1 for example) on the Q pathway. The duration $1/F_S$ of a symbol (bit) on the channel is a multiple of the chip duration, the ratio of the two being the spreading factor $Q=F_C/F_S$ of the channel. In the example of UMTS, the spreading factor Q is a power of 2 lying between 4 and 256.

Moreover, L denotes the number of propagation paths allowed for by the receiver 5, and W the length of the impulse response of the channel, expressed in terms of number of chips (for example W=6.Q for a response over 400 μs).

Figure 2:
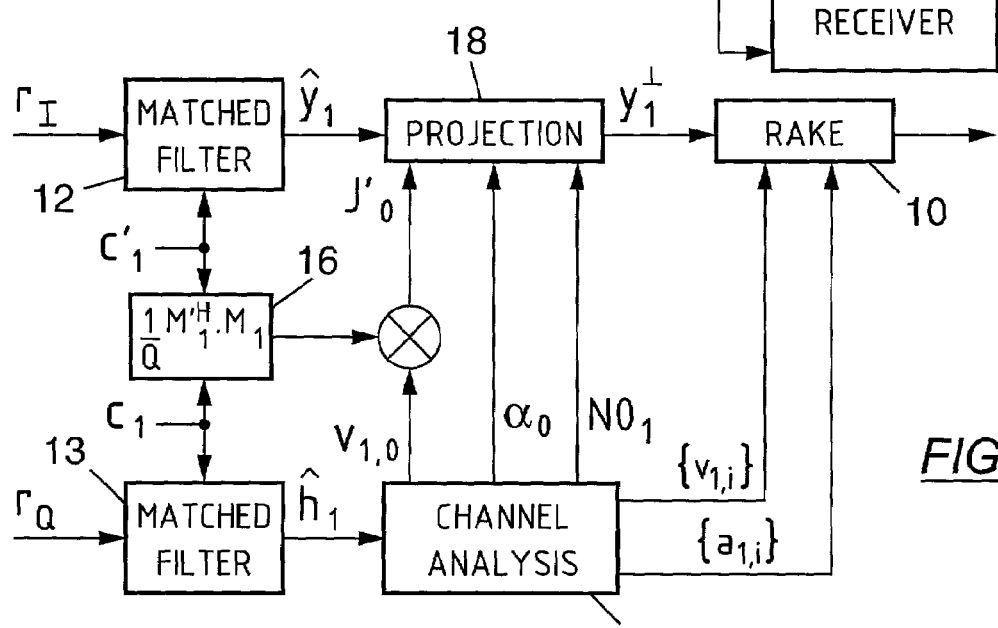
FIGS. 2 and 3 are schematic diagrams of receivers belonging to the base station of FIG. 1.
Figure 3:
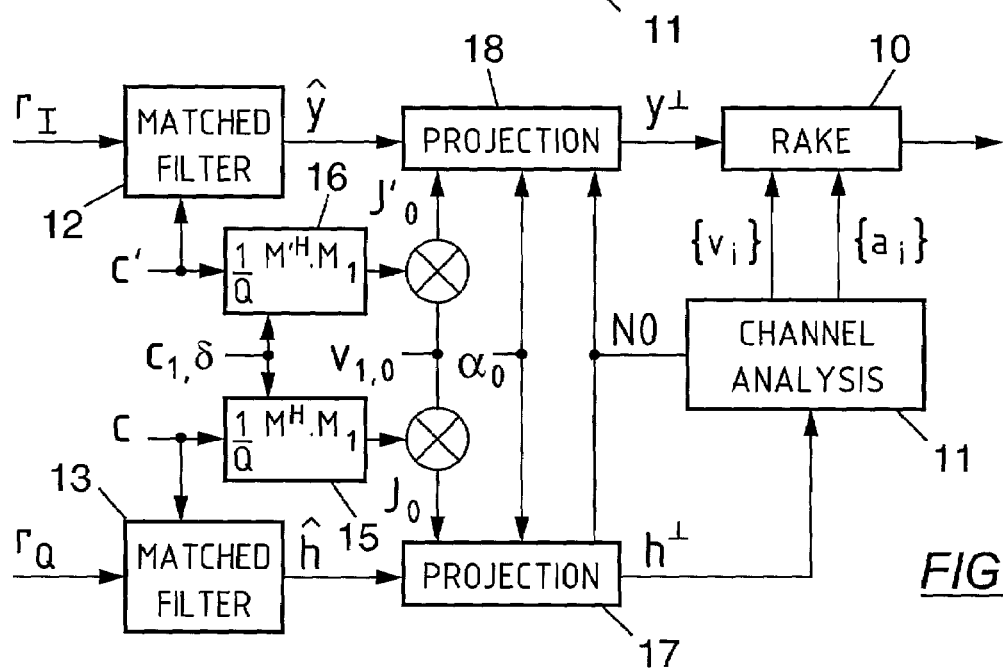

The receiver 5 uses a "rake" receiver 10 of conventional type (FIGS. 2 and 3). The channel propagation profile is defined by a set of eigenvectors $v_i$ and of associated eigenvalues $\lambda_i$ for $0 \leq i < L$, which is calculated with a relatively large periodicity (for example of the order of about a hundred milliseconds) by a channel analysis module 11. Each eigenvector $v_i$, of dimension W, is a waveform associated with an echo in the impulse response of the channel. In a traditional "rake" receiver, each eigenvector $v_i$ represents a pulse suffering a time shift. In the "rake" receiver 10, each eigenvector $v_i$ is associated with an amplitude $a_i$ which varies from one bit to another. The amplitude $a_i$, calculated for each bit by the module 11, is a random variable such that the mathematical expectation of $|a_i|^2$ is equal to the eigenvalue $\lambda_i$. The "rake" receiver 10 receives an input vector of dimension W, calculates the scalar product of this input vector with each of the eigenvectors $v_i$, then the sum of these L scalar products weighted by the amplitudes $a_i^*$. This weighted sum is a soft estimate of the bit sent b.

In a manner known per se, the channel analysis module 11 can proceed as follows in order to estimate the pairs of parameters $(v_i, a_i)$ from successive input vectors X of dimension W representing successive estimates of the impulse response of the relevant channel which are obtained by means of the pilot bits:

calculation of the mathematical expectation K of the matrix $X.X^H$ over a typical duration of the order of about a hundred milliseconds;

diagonalization of the matrix K, and selection of the L eigenvalues of largest moduli $\lambda_i$ ($0 \leq i < L$, with $|\lambda_0| \geq |\lambda_1| \geq \ldots \geq |\lambda_{L-1}|$) re associated with eigenvectors $v_i$;

projection of the vector X onto each of the eigenvectors retained $v_i$, so as to obtain the amplitudes $a_i$. These amplitudes may be obtained by simple projection ($a_i = v_i^H \cdot X$), or by weighted projection so as to produce the estimate according to the maximum a posteriori criterion $$\left( \text{MAP: } a_i = \frac{\lambda_i}{\lambda_i + N0} \cdot v_i^H \cdot X \right),$$

N0 designating an estimate of the noise power on the channel). Other known estimation procedures are also useable (estimation in the sense of least squares, under zero constraint, etc.);

calculation of the noise power N0 equal to the mathematical expectation of the energy per bit $|B|^2$ of the residual noise $$B = X - \sum_{i=0}^{L-1} a_i \cdot v_i.$$

In regard to the terminal handled by a receiver 5, the signal r received by the base station in respect of the relevant bit b can be written in the form of a vector of dimension Q+W−1:

$$r = (b.M' + j.M).h + n \quad (1)$$

where:
h is a vector of dimension W containing the impulse response of the channel between the terminal and the base station, sampled at the chip rate;

M and M' are Toeplitz matrices with Q+W−1 rows and W columns, whose columns are defined by the spreading codes c=[c(0), c(1), . . . , c(Q−1)] and c'=[c'(0), c'(1), . . . , c'(Q−1)] used by the terminal on the Q pathway and on the I pathway, respectively:

$$M = \begin{pmatrix} c(0) & 0 & \ldots & 0 \\ c(1) & c(0) & \ddots & \vdots \\ \vdots & c(1) & \ddots & 0 \\ c(Q-1) & \vdots & \ddots & c(0) \\ 0 & c(Q-1) & & c(1) \\ \vdots & \ddots & \ddots & \vdots \\ 0 & \ldots & 0 & c(Q-1) \end{pmatrix} \quad (2)$$

$$M' = \begin{pmatrix} c'(0) & 0 & \ldots & 0 \\ c'(1) & c'(0) & \ddots & \vdots \\ \vdots & c'(1) & \ddots & 0 \\ c'(Q-1) & \vdots & \ddots & c'(0) \\ 0 & c'(Q-1) & & c'(1) \\ \vdots & \ddots & \ddots & \vdots \\ 0 & \ldots & 0 & c'(Q-1) \end{pmatrix} \quad (3)$$

n is a vector containing samples of additive noise. This noise is not necessarily white noise since it incorporates the contributions from the other channels, emanating from the other terminals transmitting at the same time.

On the I pathway, the real part $r_I$ of this signal r is fed to a matched filter 12 corresponding to the spreading code c' assigned to the data bits of the channel. On the Q pathway, another matched filter 13, operating with the spreading code c, receives the imaginary part $r_Q$ of the signal r and produces a first estimate of the impulse response of the channel:

$$\hat{h} = M^H \cdot r_I \quad (4)$$

FIG. 2 uses similar notation to that of FIG. 3. An index 1 is appended thereto to signify that the receiver of FIG. 2 is the one which processes the channel having the most energy. This channel is easily identified, for example by maximizing the average of the norm of the vectors $\hat{h}$ over the period of updating of the eigenvectors by the modules 11.

In this receiver 5 assigned to the most powerful channel (FIG. 2), the channel analysis module 11 operates on the basis of the vectors $X = \hat{h}_1$ successively supplied by the matched filter 13. It deduces therefrom the eigenvectors $v_{1,i}$ and the associated instantaneous amplitudes $a_{1,i}$ ($0 \leq i < L$) supplied to the "rake" receiver 10. The eigenvalues corresponding to the eigenvectors $v_{1,i}$ are denoted $\alpha_i = \lambda_{1,i}$.

The highest-energy path of the response of this most powerful channel corresponds to the eigenvector $v_{1,0}$ and to the eigenvalue $\lambda_{1,0} = \alpha_0$. This eigenvector $v_{1,0}$ defines in the signal space a direction along which interference may affect the other channels. After projection onto the signal subspace corresponding to another channel after matched filtering, the direction of interference is defined by the normed vector:

$$J_0 = \frac{1}{Q} \cdot M^H \cdot M_1 \cdot v_{1,0} \quad (5)$$

for a Q pathway, $$J_0' = \frac{1}{Q} \cdot M'^H \cdot M_1 \cdot v_{1,0} \quad (6)$$

for an I pathway, where $M_1$ is the matrix of codes which relates to the pilot channel received with the most power, taking account of the possible time shift δ (in terms of number of chips) between the relevant channel and the most powerful channel:

$$M_1 = \begin{pmatrix} c_1(\delta) & 0 & \ldots & 0 \\ c_1(\delta+1) & c_1(\delta) & \ddots & \vdots \\ \vdots & c_1(\delta+1) & \ddots & 0 \\ c_1(\delta+Q-1) & \vdots & \ddots & c_1(\delta) \\ 0 & c_1(\delta+Q-1) & & c_1(\delta+1) \\ \vdots & \ddots & \ddots & \vdots \\ 0 & \ldots & 0 & c_1(\delta+Q-1) \end{pmatrix} \quad (7)$$

The matrices $$\frac{1}{Q} \cdot M^H \cdot M_1 \text{ and } \frac{1}{Q} \cdot M'^H \cdot M_1$$

involved in the expressions (5) and (6) are constant when short codes are used (periodicity of one bit time), thereby minimizing the calculations. Otherwise, the vectors $J_0$ and $J'_0$ need to be calculated for each bit.

These two matrices are calculated by respective modules 15 and 16 in the receivers of the type represented in FIG. 3, as a function of the codes c and $c_1$ and the shift $\delta$ for $$\frac{1}{Q} \cdot M^H \cdot M_1$$

(module 15) and as a function of the codes c' and $c_1$ and of the shift $\delta$ for $$\frac{1}{Q} \cdot M'^H \cdot M_1$$

(module 16). In each receiver (FIG. 3), the eigenvector $v_{1,0}$ is multiplied by the matrices $$\frac{1}{Q} \cdot M^H \cdot M_1$$

and $$\frac{1}{Q} \cdot M'^H \cdot M_1$$

produced by the modules 15 and 16 so as to obtain the normed vectors $J_0$ and $J'_0$ according to relations (5) and (6), respectively.

A module 16 is also present in the receiver of FIG. 2 so as to calculate the matrix $$\frac{1}{Q} \cdot M'^H_1 \cdot M_1$$

as a function of the codes $c'_1$ and $c_1$ (the shift $\delta$ is zero between the I and Q pathways which are synchronous). This matrix serves also to determine an interferer direction $J'_0$ for the data pathway.

In the receiver according to FIG. 3, the interference direction $J_0$ is supplied to a module 17 which projects the estimate ĥ of the impulse response delivered by the matched filter 13 onto a subspace orthogonal to $J_0$, thereby giving rise to a corrected response vector $H^\perp$. The correction consists more precisely in deducting from ĥ a vector proportional to its projection along the direction $J_0$. We can in particular take:

$$h^\perp = \hat{h} - \frac{\alpha_0}{\alpha_0 + N0} J_0 \cdot J_0^H \cdot \hat{h} = \left[ Id - \frac{\alpha_0}{\alpha_0 + N0} J_0 \cdot J_0^H \right] \cdot \hat{h} \quad (8)$$

where the weighted projection matrix $$\left[ Id - \frac{\alpha_0}{\alpha_0 + N0} J_0 \cdot J_0^H \right]$$

is updated at relatively low frequency. It is the corrected vector $h^\perp = X$ which is supplied to the channel analysis module 11.

Likewise, in each receiver, the interference direction $J'_0$ is supplied to a module 18 which projects the output vector y from the matched filter 12 onto a subspace orthogonal to $J'_0$, thereby giving rise to a corrected vector $y^\perp$. The correction consists in deducting from ŷ a vector proportional to its projection along the direction $J'_0$. We can in particular take:

$$y^\perp = \hat{y} - \frac{\alpha_0}{\alpha_0 + N0} J'_0 \cdot J'^H_0 \cdot \hat{y} = \left[ Id - \frac{\alpha_0}{\alpha_0 + N0} J'_0 \cdot J'^H_0 \right] \cdot \hat{y} \quad (9)$$

where the weighted projection matrix $$\left[ Id - \frac{\alpha_0}{\alpha_0 + N0} J'_0 \cdot J'^H_0 \right]$$

is updated at relatively low frequency. It is the corrected vector $y^\perp$ which is supplied to the "rake" receiver 10 to estimate the information symbol sent.

In the foregoing description, the projection of the vectors ĥ and ŷ is performed onto a subspace orthogonal to a single interference direction $J_0$ or $J'_0$. It will be noted that it is possible to extend the procedure to several interference directions defined by several energy-containing paths (within the limit of the dimension of the subspace).

For example, for p>1 paths, we can take the p eigenvectors $v_{1,0}, v_{1,1}, \ldots, v_{1,p-1}$ corresponding to the eigenvalues of largest moduli $\alpha_0 = \lambda_{1,0}, \alpha_1 = \lambda_{1,1}, \ldots, \alpha_{p-1} = \lambda_{1,p-1}$ identified by the analysis module 11 processing the response $\hat{h}_1$, and we can determine the normed vectors:

$$J_i = \frac{1}{Q} \cdot M^H \cdot M_1 \cdot v_{1,i} \quad (10)$$

for a Q pathway, and $$J'_i = \frac{1}{Q} \cdot M'^H \cdot M_1 \cdot v_{1,i} \quad (11)$$

for an I pathway ($0 \leq i < p$). The weighted projection matrices of relations (8) and (9) are then replaced by $$\left[ Id - \sum_{i=0}^{p-1} \frac{\alpha_i}{\alpha_i + N0} J_i \cdot J_i^H \right]$$

and $$\left[ Id - \sum_{i=0}^{p-1} \frac{\alpha_i}{\alpha_i + N0} J'_i \cdot J'^H_i \right],$$

respectively. The p relevant paths may also be identified by analysis modules 11 belonging to distinct receivers.

The method is also applicable in the case where the base station possesses several distinct reception antennas, whose signals are combined to afford space diversity. In a case with two antennas, the subspace described by the main interferer (for a Q pathway) is generated by the matrix:

$$J_s = \begin{pmatrix} J_0 & -\frac{\rho}{|\rho|} \cdot J_0 \\ \frac{\rho}{|\rho|} \cdot J_0 & J_0 \end{pmatrix} \quad (12)$$

and the weighted projection matrix of relation (8) becomes:

$$\left[ Id - J_s \cdot \begin{pmatrix} \frac{\alpha_0 \cdot (1 + |\rho|)}{\alpha_0 \cdot (1 + |\rho|) + N0} & 0 \\ 0 & \frac{\alpha_0 \cdot (1 - |\rho|)}{\alpha_0 \cdot (1 - |\rho|) + N0} \end{pmatrix} \cdot J_s^H \right],$$

where $\rho$ is the correlation factor for the two antennas.

We claim:

1. A signal processing method for a base station of a code-division multiple access radio communication system, comprising the steps of:

feeding a first signal received by the base station to a set of filters matched to spreading codes allotted to pilot channels originating from respective radio terminals; and processing output vectors from the matched filters to estimate parameters representing said channels, whereby the estimated parameters for a channel originating from a radio terminal comprise eigenvectors representing propagation paths between said radio terminal and the base station, respectively associated with amplitudes of reception along said paths, wherein the processing of the output vectors from the matched filters comprises:

estimating parameters for at least one first channel on the basis of the output vector from a first filter matched to the spreading code allocated to said first channel;

modifying the output vector from a second filter matched to the spreading code allocated to at least one second channel, the output vector from the second matched filter having less energy than the output vector from the first matched filter; and estimating parameters for said second channel on the basis of the modified output vector of the second matched filter, and wherein the modification of the output vector from the second matched filter comprises at least one subtraction of a vector proportional to a projection of said output vector from the second matched filter parallel to a vector of the form $M^H . M_1 . v_{1,i}$, where $M_1$ and M are matrices determined by the spreading codes respectively allocated to said first and second channels, $v_{1,i}$ is one of the estimated eigenvectors for the first channel, and $(.)^H$ designates the conjugate transpose, wherein each of said pilot channels is formed jointly with a quadrature data channel emanating from the same radio terminal, the method further comprising the steps of feeding a second signal, received by the base station in phase quadrature with respect to said first signal, to a second set of filters matched to spreading codes respectively allocated to the data channels originating from the radio terminals;

modifying some at least of the output vectors from the matched filters of the second set; and estimating information symbols transmitted on a data channel originating from a radio terminal by feeding the modified output vector from the second filter matched to the spreading code allocated to said data channel to a rake receiver defined by the parameters estimated for the pilot channel originating from said radio terminal, and wherein the modification of the output vector from said matched filter of the second set comprises at least one subtraction of a vector proportional to a projection of said output vector parallel to a vector of the form $M'^H . M_1 . v_{1,i}$, where M' is a matrix determined by the spreading code allocated to said data channel.

2. A signal processing device for a base station of a code division multiple access radio communication system, comprising:

a set of filters matched to spreading codes allocated to pilot channels originating from respective radio terminals, to receive a first signal received by the base station; and means for processing output vectors from the matched filters so as to estimate parameters representing said channels, whereby the estimated parameters for a channel originating from a radio terminal comprise eigenvectors representing propagation paths between said radio terminal and the base station, respectively associated with amplitudes of reception along said paths, wherein said processing means comprise:

means for estimating parameters for at least one first channel on the basis of the output vector from a first filter matched to the spreading code allocated to said first channel;

means for modifying the output vector from a second filter matched to the spreading code allocated to at least one second channel, the output vector from the second matched filter having less energy than the output vector from the first is matched filter; and means for estimating parameters for said second channel on the basis of the modified output vector of the second matched filter, and wherein the means for modifying the output vector are arranged to subtract from the output vector from the second matched filter at least one vector proportional to a projection of said output vector from the second matched filter parallel to a vector of the form $M^H . M_1 . v_{1,i}$, where $M_1$ and M are matrices determined by the spreading codes respectively allocated to said first and second channels, $v_{1,i}$ is one of the estimated eigenvectors for the first channel, and $(.)^H$ designates the conjugate transpose.

3. A device according to claim 2, wherein said eigenvector $v_{1,i}$ is the estimated eigenvector for the first channel which is associated with the amplitude having the highest modulus on average.

4. A device according to claim 2, wherein to matrices $M_1$ and M are Toeplitz matrices having columns given by the spreading codes respectively allocated to the first and second channels, taking account of a time shift between the first and second channels.

5. A device according to claim 2, wherein said subtracted vector is given by, $$\frac{\alpha_i}{\alpha_i + N0} J_l J_l^N \hat{h},$$

where $\hat{h}$ is the output vector from the second matched filter, $$J_i = \frac{1}{Q} \cdot M^H \cdot M_1 \cdot v_{1,i}, Q$$

is a spreading factor on the pilot channels, $\alpha_i$ is an average power of reception along the propagation path represented by the eigenvector $V_{1,i}$ and N0 is an estimated noise power on the second channel.

6. A device according to claim 2, further comprising a second set of filters matched to spreading codes respectively allocated to data channels formed jointly with the pilot channels originating from the radio terminals, so as to receive a second signal received by the base station in phase quadrature with respect to said first signal, means for modifying some at least of the output vectors from the matched filters of the second set, and means for estimating information symbols transmitted on at least one data channel originating from a radio terminal, including a rake receiver defined by the parameters estimated for the pilot channel originating from said radio terminal and receiving the modified output vector from the second filter matched to the spreading code allocated to said data channel, and wherein the means for modifying the output vector from a matched filter of the second set comprise means for subtracting a vector proportional to a projection of said output vector parallel to a vector of the form $M'^H . M_1 . v_{1,i}$, where M' is a matrix determined by the spreading code allocated to said data channel.

* * * * *

UNITED STATES PATENT AND TRADEMARK OFFICE
CERTIFICATE OF CORRECTION

PATENT NO. : 7,184,465 B2 Page 1 of 1
APPLICATION NO. : 10/164129
DATED : February 27, 2007
INVENTOR(S) : Alexandre Jard et al.

It is certified that error appears in the above-identified patent and that said Letters Patent is hereby corrected as shown below:

Column 9:
Line 66, "$M^H,M_1,v_{1,i},$" should be -- $M^H.M_1.v_{1,i}$, --.

Column 10:
Line 51, delete "is";
Line 59, "$M^H,M_1.v_{1,i},$" should be -- $M^H.M_1.v_{1,i}$, --.

Signed and Sealed this

Fourth Day of March, 2008

JON W. DUDAS
*Director of the United States Patent and Trademark Office*